United States Patent
Mishra et al.

(10) Patent No.: US 12,277,040 B2
(45) Date of Patent: Apr. 15, 2025

(54) IN-PLACE RECOVERY OF FATAL SYSTEM ERRORS AT VIRTUALIZATION HOSTS

(71) Applicant: Microsoft Technology Licensing, LLC, Redmond, WA (US)

(72) Inventors: Binit Ranjan Mishra, Kenmore, WA (US); Mukhtar Ahmed, Everett, WA (US); Christina Marianne Curlette, Redmond, WA (US); Steven Adrian West, Redmond, WA (US); Gaurav Jagtiani, Kirkland, WA (US); Naga Kiran Govindaraju, Medina, WA (US); James George Cavalaris, Bothell, WA (US); Drew Douglas Cross, Bothell, WA (US); Jason Stewart Wohlgemuth, Seattle, WA (US); James Anthony Schwartz, Jr., Seattle, WA (US); Jennifer Marie Bourlier, Seattle, WA (US); Sri Harsha Kanukuntla, Morganville, NJ (US); Emma Sutherland Boyd, Richmond, VA (US); Scott Chao-Chueh Lee, Bellevue, WA (US); Vijaybalaji Madhanagopal, Redmond, WA (US); Terence Kwok Tak Chan, Redmond, WA (US); Yuri Dotsenko, Redmond, WA (US); Peter Hanpeng Jiang, Kirkland, WA (US); Aacer Hatem Daken, Renton, WA (US); Emily Nicole Wilson, Seattle, WA (US); Emily Cara Clemens, Snohomish, WA (US); Cody Dean Hartwig, Seattle, WA (US); Raz Meir Aloni, Seattle, WA (US); Sharon Scarlet Tang, Kirkland, WA (US); Minsang Kim, Bellevue, WA (US); Shen Wang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 18/330,651

(22) Filed: Jun. 7, 2023

(65) Prior Publication Data
US 2024/0338282 A1    Oct. 10, 2024

Related U.S. Application Data

(60) Provisional application No. 63/494,205, filed on Apr. 4, 2023.

(51) Int. Cl.
*G06F 11/14*     (2006.01)
*G06F 11/07*     (2006.01)

(52) U.S. Cl.
CPC ...... *G06F 11/1471* (2013.01); *G06F 11/0772* (2013.01); *G06F 11/1441* (2013.01)

(58) Field of Classification Search
CPC ............ G06F 11/1471; G06F 11/0772; G06F 11/1441
See application file for complete search history.

(56) References Cited

U.S. PATENT DOCUMENTS

| | | | | |
|---|---|---|---|---|
| 10,860,412 | B2 * | 12/2020 | Noe | G06F 11/0724 |
| 11,307,921 | B2 * | 4/2022 | Noe | G06F 11/3082 |
| 2016/0110210 | A1 * | 4/2016 | Vecera | G06F 9/45558 |
| | | | | 718/1 |

OTHER PUBLICATIONS

Russinovich, Mark, "Improving Azure Virtual Machines Resiliency with Project Tardigrade", Retrieved From: https://azure.microsoft.com/en-us/blog/improving-azure-virtual-machines-resiliency-with-project-tardigrade/, Aug. 14, 2019, 6 Pages.

(Continued)

*Primary Examiner* — Nadeem Iqbal
(74) *Attorney, Agent, or Firm* — Workman Nydegger (57) ABSTRACT

In-place recovery of fatal system errors at virtualization hosts. A device identifies an occurrence of a fatal system (Continued)

error in the first instance of a host operating system (OS) executing in a computer system. The device determines to perform an in-place recovery for the fatal system error. The device performs the in-place recovery, including pausing the execution of a virtual machine (VM) by the first instance of the host OS, preserving a state of the VM within system memory of the computer system, and resuming the execution of the VM by a second instance of the host OS executing in the computer system based on the state of the VM that is preserved within the system memory of the computer system.

20 Claims, 5 Drawing Sheets

(56) References Cited

OTHER PUBLICATIONS

Russinovich, Mark, "Inside Azure Datacenter Architecture with Mark Russinovich—BRK3060", Retrieved From: https://www.youtube.com/watch?v=S2zguwKvlQk, May 9, 2019, 3 Pages.

* cited by examiner

IN-PLACE RECOVERY OF FATAL SYSTEM ERRORS AT VIRTUALIZATION HOSTS

CROSS-REFERENCE TO RELATED APPLICATIONS

This application claims priority to, and the benefit of, U.S. Provisional Patent Application Ser. No. 63/494,205, filed Apr. 4, 2023, and entitled "IN-PLACE RECOVERY OF FATAL SYSTEM ERRORS AT VIRTUALIZATION HOSTS," the entire contents of which are incorporated by reference herein in their entirety.

BACKGROUND OF THE INVENTION

In computing, a fatal system error (also known as a system crash, stop error, kernel error, or bug check) occurs when an operating system (OS) halts because it has reached a condition where it can no longer operate safely (e.g., where critical data could be lost, or the system damaged in other ways). Fatal system errors are often the result of a severe software-level or hardware-level problem (e.g., hardware issues, firmware issues, kernel bugs, driver bugs, user-mode misbehaviors) that compromises safe system operation. If the OS continues to run after its integrity is compromised, it could corrupt data or compromise the system's security. To protect from data loss after a fatal system error, the OS halts running processors and restarts the computer. In some situations, before restarting the computer, the OS also persists (e.g., to local persistent storage, to a network location) a memory dump containing additional information about the contents of memory when the fatal system error occurred. A memory dump can include information about kernel-mode memory contents (e.g., a kernel-mode dump file) and/or information about user-mode memory contents (e.g., a user-mode dump file). Due to their large size, persisting memory dumps can take considerable time.

No OS is immune from encountering fatal system errors. This includes server-focused OSs, such as host OSs at virtualization host computer systems that host virtualized workloads (e.g., tenant workloads) in the form of a plurality of virtual machines (VMs) that each executes a corresponding guest OS (and application(s)) in isolation from other VMs at the system. Because a typical fatal system error leads to an OS crash and a system reboot, a fatal system error at the host OS of a virtualization host computer system can cause significant disruptions to workloads before those VMs can be recreated and resumed following the system reboot. This is particularly true on the server-class hardware typically used for virtualization host computer systems, in which a system reboot may involve a lengthy reset of the server firmware and any attached devices (e.g., drive arrays and network interface cards). In many cases, following a host OS encountering a fatal system error on a virtualization host computer system, and a resulting firmware reset, there could be a "blackout time" for workloads of up to thirty minutes or more before the resumption of the VMs hosting those workloads is completed.

The subject matter claimed herein is not limited to embodiments that solve any disadvantages or that operate only in environments such as those described supra. Instead, this background is only provided to illustrate one example technology area where some embodiments described herein may be practiced.

BRIEF DESCRIPTION OF THE DRAWINGS

To describe how the advantages and features of the systems and methods described herein can be obtained, a more particular description of the embodiments briefly described supra will be rendered by reference to specific embodiments thereof, which are illustrated in the appended drawings. Understanding that these drawings depict only typical embodiments of the systems and methods described herein and are not, therefore, to be considered to be limiting in their scope, certain systems and methods will be described and explained with additional specificity and detail through the use of the accompanying drawings in which.

DETAILED DESCRIPTION OF THE INVENTION

Virtual machine (VM) preserving host updates (VM-PHU) refers to technologies for updating host operating systems (OSs), which persist the memory and device state of all running guest VMs, perform a soft reboot of the host OS and any virtualization stack components executing therein into updated code, restore the state of the VMs, and then resume the VMs. To minimize resource consumption and VM disruption, VM-PHU leaves VM memory in physical memory pages and other states in persisted pages across the soft reboot. As such, VM-PHU technologies operate to minimize VM blackout time when rebooting a host OS for a software update. VM-PHU technologies are described in U.S. Pat. No. 9,110,762 by the Applicant, entitled "VIRTUAL MACHINE-PRESERVING HOST UPDATES," and which was granted on Aug. 18, 2015, the entire disclosure of which is incorporated by reference in its entirety. An example of VM-PHU technology is "kernel soft reboot" (KSR) from MICROSOFT CORPORATION, which directly transitions to an updated host OS, bypassing firmware reset of the server and attached devices. KSR technologies are described in U.S. Pat. No. 9,875,115 by the Applicant, entitled "MEMORY-PRESERVING REBOOT," and which was granted on Jan. 23, 2018, the entire disclosure of which is incorporated by reference in its entirety.

While VM-PHU and related technologies such as KSR are designed for updating a host OS with minimal interruption to the VMs, embodiments utilize these technologies to reduce the blackout time workloads (e.g., tenant workloads) encounter when a host OS encounters a fatal system error. Embodiments introduce a fatal system error handler component (handler component), such as a driver, at a host OS that intercepts and holds a fatal system error (e.g., a system crash, a stop error, a kernel error, or a bug check), such that the fatal system error is prevented from causing a system reboot. In embodiments, this handler component intercepts and holds a fatal system error within milliseconds of the fatal system error occurring.

After intercepting and holding a fatal system error, the handler component determines whether to attempt an in-place recovery of the fatal system error (e.g., using VM-PHU or similar technologies that restart a host OS while preserving the workloads operating at the host OS). In embodiments, when determining whether to attempt an in-place recovery, the handler component considers factors such as 1) the nature of the fatal system error (e.g., based on an error code, error code parameters, and the like), 2) the success of prior in-place recovery attempts for this fatal system error type or a similar fatal system error type, 3) an interruption tolerance of the workloads (e.g., tenant workloads) on VMs (e.g., tenant VMs), 4) a running success rate of in-place recoveries at this machine or similarly-configured machines, and 5) acceptable downtime thresholds (e.g., per a tenant's service level agreement (SLA)).

In embodiments, if the handler component determines not to attempt an in-place recovery, the handler component permits the fatal system error to proceed as normal (e.g., writing a memory dump, halting running processes, and restarting the computer). This means the workloads will need to be recreated (e.g., on another host or this same host) once the system restart has been completed, potentially causing several minutes of blackout time for those workloads.

If, on the other hand, the handler component determines to attempt an in-place recovery, embodiments mitigate the fatal system error by bringing the host OS into a healthy state while preserving VM memory. In embodiments, the memory and CPU states of each hosted VM are preserved within system memory; when a healthy host OS is available, the hosted VMs consume this preserved state and resume normal activity on this healthy host OS, thereby circumventing any potential VM reboots. In some embodiments, the process utilizes VM-PHU technology, such as KSR, which preserves the hosted VM state and restarts the host OS into a healthy state. In other embodiments, this process leverages a "standby" host OS or a host OS brought up as part of the in-place recovery alongside the faulted host OS. From when VM execution is ceased on the faulted host OS to when VM execution is resumed on a healthy OS, running applications on the hosted VMs briefly "freeze" because the VM's virtual CPUs are suspended. For example, when using VM-PHU, this includes the time the host OS takes to restart. This causes minimal impact on workloads supported by the host OS. For example, from the perspective of a service operating at one of these VMs, this experience may manifest similarly to a network connection being temporarily lost but quickly resumed due to retry logic.

In embodiments, when an in-place recovery is successful, the recovery is completed in seconds (e.g., rather than minutes). This avoids potentially large blackout times for workloads (e.g., tenant workloads) that would have otherwise occurred if the fatal system error had been handled using conventional techniques. This means embodiments of the present systems and methods protect a user experience from an underlying host OS failure. Embodiments of the present systems and methods, therefore, avoid extended downtimes for the workloads, which would have otherwise led to a degraded experience and may have even violated SLAs.

Figure 1:
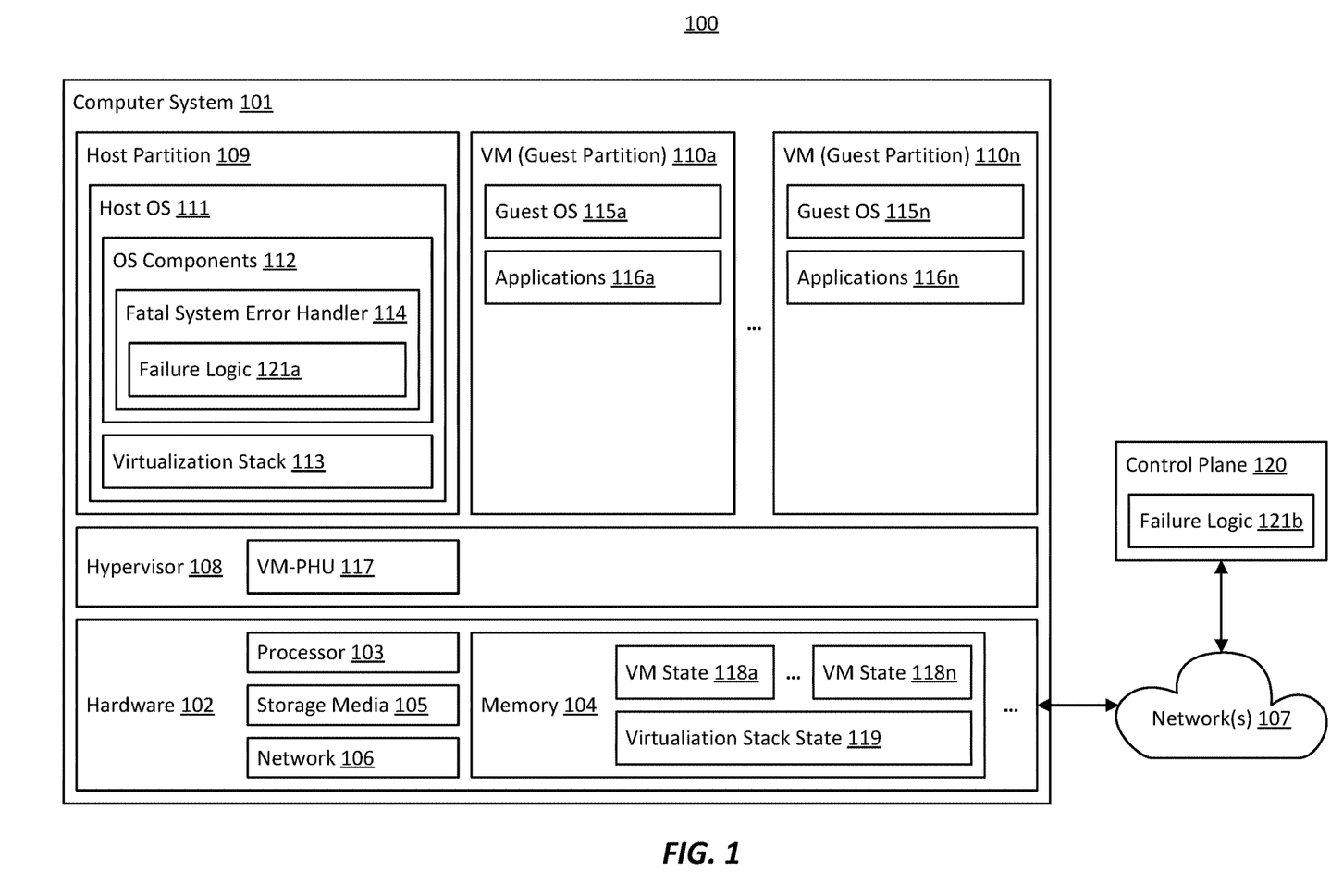
FIG. 1 illustrates an example of a computer architecture that facilitates in-place recovery of fatal system errors at a virtualization host.

FIG. 1 illustrates an example 100 of a computer architecture that facilitates in-place recovery of fatal system errors at a virtualization host. In example 100, the computer architecture includes a computer system 101 comprising hardware 102. Illustrated examples of hardware 102 include a processor system 103. In embodiments, processor system 103 is a central processing unit (CPU) comprising one or more processor cores or a plurality of CPUs, each including one or more processor cores. Illustrated examples of hardware 102 also include a memory 104 (e.g., system or main memory), a storage media 105 (e.g., a single computer-readable storage medium or a plurality of computer-readable storage media), and a network interface 106 (e.g., one or more network interface cards) for connection to other computer systems via a network 107. Although not shown, other examples of hardware 102 include a trusted platform module (TPM) for facilitating measured boot features, an input/output (I/O) memory management unit (IOMMU) that connects a direct memory access (DMA)-capable I/O bus (and any devices connected to it) to memory 104, a graphics processing unit (GPU) for rendering image data, a video display interface for connecting to display hardware, a user input interface for connecting to user input devices, an external bus for connecting to external devices, and the like.

As illustrated in example 100, a hypervisor 108 executes directly on hardware 102. Hypervisor 108 allocates hardware resources (e.g., processor system 103, memory 104, I/O resources) into several partitions. In embodiments, these partitions include a host partition 109, within which a host OS 111 executes. In embodiments, these partitions also include one or more guest partitions, each corresponding to a VM. FIG. 1 illustrates VMs 110, including VM 110a, within which guest OS 115a and applications 116a execute, and VM 110n, within which guest OS 115n and applications 116n execute. An ellipsis indicates that hypervisor 108 could operate any number of VMS.

As illustrated, host OS 111 includes a virtualization stack 113, which uses application program interface (API) calls (e.g., hypercalls) to hypervisor 108 to create, manage, and destroy each VM of VMs 110. In embodiments, virtualization stack 113 makes decisions about what virtual CPUs to create for each VM, which portion(s) of memory 104 to allocate to each VM, operates para-virtual drivers that multiplex VM access to physical hardware devices (e.g., storage media 105, network interface 106), and facilities limited communications among partitions via a VM bus (not shown), among other things.

As illustrated, host OS 111 also includes OS components 112, such as an OS kernel, drivers, etc. In FIG. 1, these OS components 112 include a fatal system error handler 114. In embodiments, fatal system error handler 114 intercepts and "holds" a fatal system error, preventing normal handling of the fatal system error that would lead to a reboot of computer system 101. Then, fatal system error handler 114 determines whether to attempt an in-place recovery of the fatal system error. In making this determination, fatal system error handler 114 uses failure logic 121, which may reside at computer system 101 (e.g., failure logic 121a) or at another computer system such as control plane 120 (e.g., failure logic 121b).

If fatal system error handler 114 determines that an in-place recovery will not be attempted, it lets normal handling of the fatal system error proceed (e.g., halt running processors and reboot, potentially after persisting a memory dump). If fatal system error handler 114 determines that an in-place recovery is to be attempted, it performs actions to bring host OS 111 into a healthy state while preserving memory used by VMs 110. In embodiments, fatal system error handler 114 makes this determination based on an estimation of whether computer system 101 is likely to recover from the fatal system error if an in-place recovery is attempted.

To perform an in-place recovery, fatal system error handler 114 initiates a recovery process that preserves the VM state within memory 104 (e.g., VM state 118a for VM 110a, 118n for VM 110n, virtualization stack state 119) before shutting down host OS 111. The recovery process then uses this preserved VM state to continue the execution of VMs 110 on a healthy host OS. In some embodiments, fatal system error handler 114 utilizes a VM-PHU component 117 to reboot host OS 111 within host partition 109 as a healthy host OS. Although VM-PHU component 117 is illustrated as residing at hypervisor 108, in embodiments, it could at least partially be implemented at virtualization stack 113. In other embodiments, fatal system error handler 114 utilizes a "standby" host OS within a different partition at computer system 101 or brings up an alternative host OS within a different partition at computer system 101.

Figure 2:
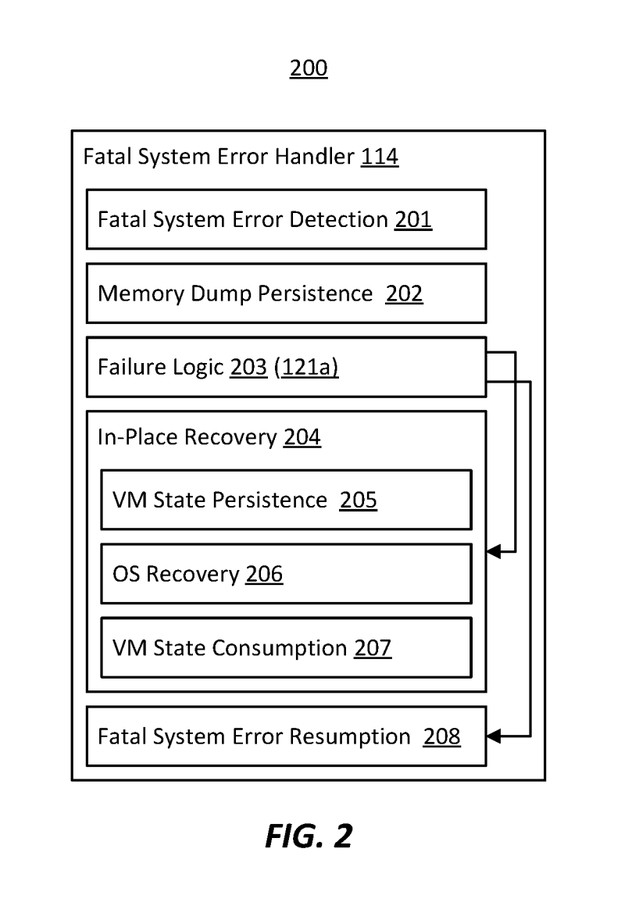
FIG. 2 illustrates an example of a fatal system handler for initiating an in-place recovery of a fatal system error at a virtualization host.

FIG. 2 illustrates example 200 of the fatal system error handler 114 of FIG. 1. Each internal component of the fatal system error handler 114 depicted in FIG. 2 represents various functionalities that the fatal system error handler 114 might implement in various embodiments described herein. It will be appreciated, however, that the depicted components—including their identity and arrangement—are presented merely as an aid in describing example embodiments of the fatal system error handler 114. While the form of fatal system error handler 114 may vary depending on implementation, in embodiments, fatal system error handler 114 is a driver operating at host OS 111. However, in alternative embodiments, fatal system error handler 114 resides at hypervisor 108, within a sub-partition of host partition 109 (e.g., at a secure kernel), or the like.

In FIG. 2, fatal system error handler 114 includes a fatal system error detection component, referred to herein as error detection component 201. In embodiments, when a thread executing at host OS 111 encounters a fatal system error, control flow for that thread passes to error detection component 201 (e.g., because error detection component 201 is registered to receive a callback, such as a crash notification, when fatal system errors occur). In embodiments, when control passes to error detection component 201, error detection component 201 holds further processing of the fatal system error. This means that the thread that caused the fatal system error is suspended. In some embodiments, other threads at host OS 111 are permitted to continue executing while, in other embodiments, error detection component 201 suspends those threads as well.

In some embodiments, error detection component 201 notifies control plane 120 of the occurrence of the fatal system error, potentially with information about the fatal system error, such as a signature, bucket, or fingerprint. In embodiments, information sent to the control plane 120 includes an error code, error parameters, interrupt request level (IRQL), if the processor at which the fatal system error occurred was clock owner, a process context, a stack walk, and the like.

In embodiments, fatal system error handler 114 includes a memory dump persistence component 202. In some embodiments, memory dump persistence component 202 persists memory dump information, which contains additional information about the contents of memory 104 when the fatal system error occurred. In some embodiments, memory dump persistence component 202 persists memory dump information to non-volatile storage (e.g., storage media 105). In other embodiments, memory dump persistence component 202 preserves memory dump information in storage media 105 until a healthy host OS is available; then, once the healthy host OS is available, memory dump persistence component 202 persists the preserved memory dump information to non-volatile storage (e.g., as part of fatal system error handler 114 running at the healthy host OS).

Fatal system error handler 114 also includes failure logic 203, corresponding to failure logic 121*a* of FIG. 1. In embodiments, failure logic 203 estimates whether computer system 101 is likely to recover from the fatal system error if an in-place recovery is attempted and either determines to proceed with the in-place recovery (in-place recovery component 204) or determines to let the fatal system error proceed (fatal system error resumption component 208). In some embodiments, failure logic 203 makes this determination entirely at computer system 101 (failure logic 121*a*). In other embodiments, failure logic 203 makes this determination based, at least in part, on logic executing at an external computer system (e.g., failure logic 121*b* at control plane 120).

In embodiments, failure logic 203 utilizes logic, historical data, and information about VMs 110 operating at computer system 101. As examples, failure logic 203 considers 1) the nature of the fatal system error (e.g., based on an error code, error code parameters, and the like), 2) the success of prior in-place recovery attempts for this fatal system error type or a similar fatal system error type, 3) an interruption tolerance of the workloads on VMs, 4) a running success rate of in-place recoveries at this machine or similarly-configured machines, and 5) acceptable downtime thresholds per a tenant's SLA. In some embodiments, if the fatal system error was due to a hardware failure, this logic dictates that in-place recovery is not to be attempted.

Fatal system error handler 114 also includes an in-place recovery component 204, which attempts an in-place recovery of host OS 111 while maintaining VMs 110 in storage media 105. As shown, in-place recovery component 204 includes a VM state persistence component 205. In embodiments, VM state persistence component 205 pauses the execution of VMs 110 (e.g., by suspending their virtual processors). Then it preserves the state of VMs 110 (e.g., memory state, virtual processor register state) and other relevant information, such as a state of virtualization stack 113 (e.g., virtualization stack state 119) within storage media 105. In some embodiments, VM state persistence component 205 utilizes VM-PHU component 117 to preserve this state. In embodiments, state preservation includes storing a record of which memory pages belong to each VM, which memory pages belong to the relevant state of virtualization stack 113, etc.

Figure 3A:
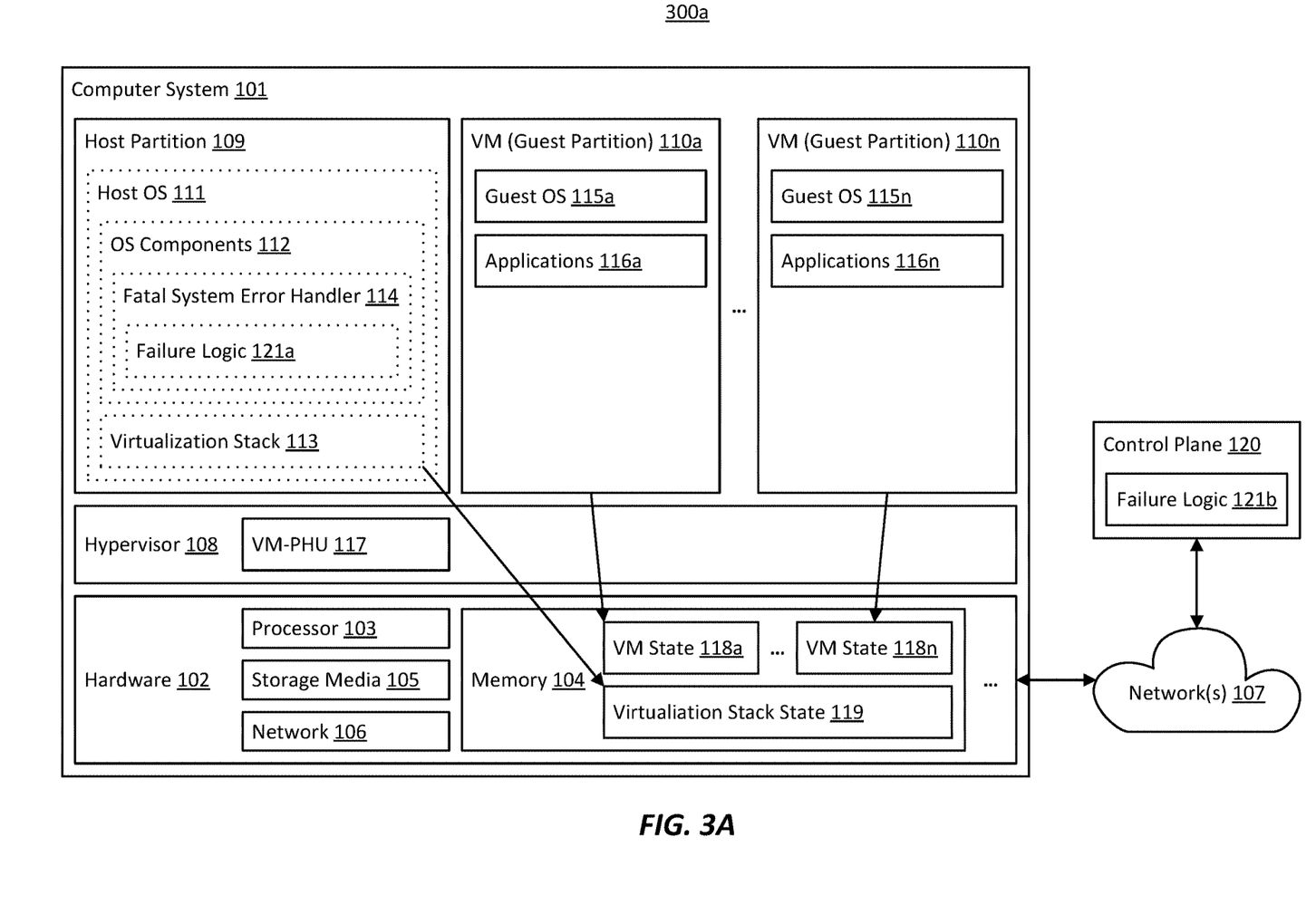
FIG. 3A illustrates an example of preserving virtual machine (VM) memory states as part of an in-place recovery.

Demonstrating one example of the operation of VM state persistence component 205, FIG. 3A illustrates example 300*a* of preserving VM memory state as part of an in-place recovery, using VM-PHU component 117. In FIG. 3A, arrows show that VM state persistence component 205 has persisted the state of virtualization stack 113 and VMs 110 in memory 104 (e.g., virtualization stack state 119, VM state 118). This is true even when the host OS 111 (and the components operating therein) are shut down, as indicated using broken lines to delineate host OS 111 (and the components operating therein).

In-place recovery component 204 also includes an OS recovery component 206, which obtains a healthy instance of host OS 111. In some embodiments, OS recovery component 206 obtains this healthy instance of host OS 111 by using VM-PHU component 117 to reboot host OS 111 within host partition 109. In other embodiments, this healthy instance of host OS 111 is a standby host OS operating in a different partition at computer system 101. Yet other embodiments, OS recovery component 206 starts another instance of host OS 111 within a different partition at computer system 101.

In some embodiments, OS recovery component 206 performs a modified shutdown of the faulted instance of host OS 111 at host partition 109. In general, due to the faulted state of host OS 111, this modified shutdown performs a reduced set of operations compared to a normal shutdown. For example, this modified shutdown may skip notifying OS components of the shutdown (e.g., which would normally trigger them to save their state), may skip a shutdown of user mode components, and the like.

In-place recovery component 204 also includes a VM state consumption component 207. In embodiments, once OS recovery component 206 has obtained a healthy instance of host OS 111, VM state consumption component 207 (operating at the healthy instance of host OS 111) restores the functioning of VMs 110 on top of the healthy instance of host OS 111. This includes, e.g., pointing virtualization stack 113 at this healthy instance of host OS 111 to VM state 118 and virtualization stack state 119, which enables VMs 110 to consume VM state 118. In embodiments, after the operation of VM state consumption component 207, in-place recovery component 204 resumes execution of VMs 110.

Figure 3B:
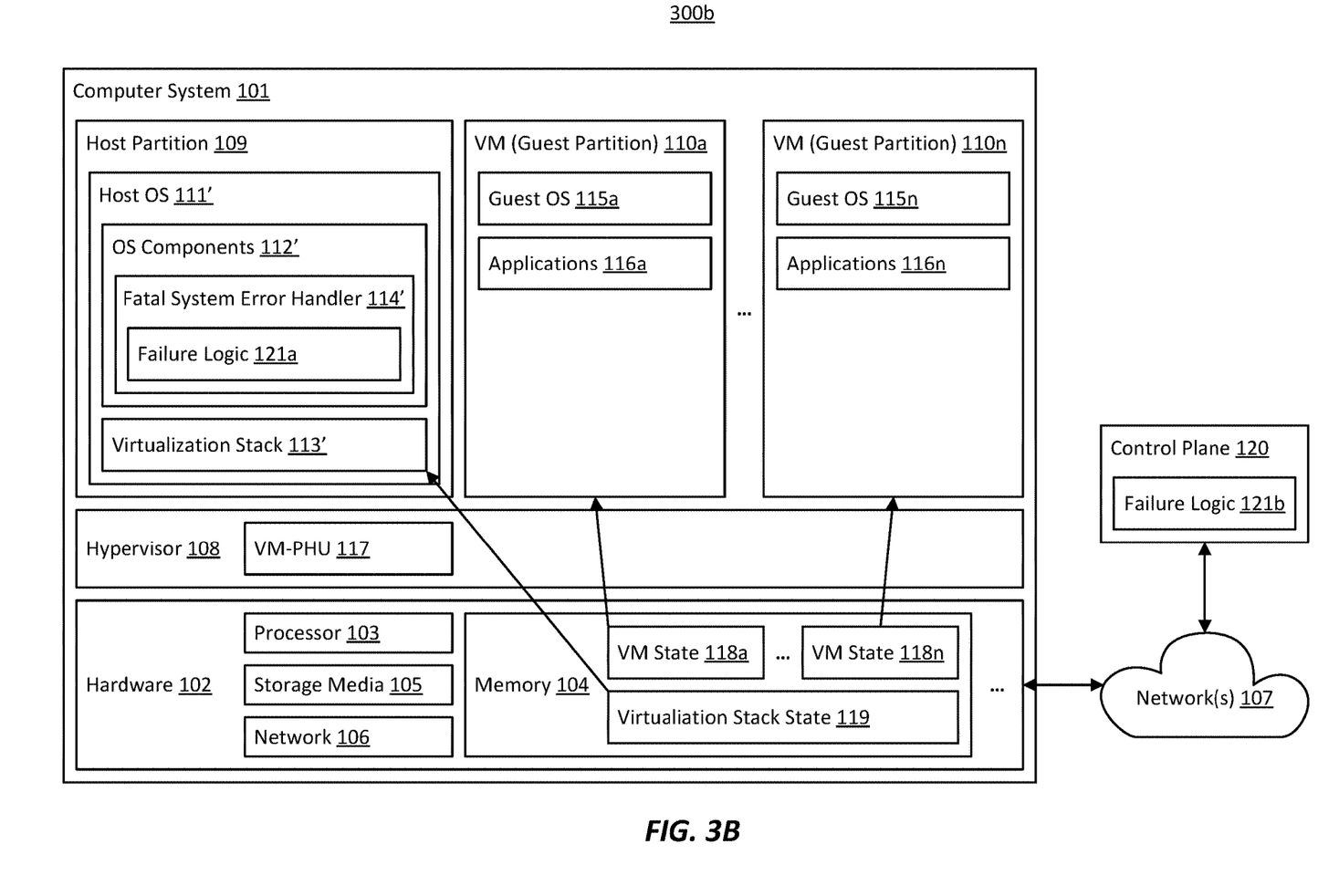
FIG. 3B illustrates an example of reconnecting the VM memory states as part of an in-place recovery.

FIG. 3B illustrates an example 300b of reconnecting the VM memory state as part of an in-place recovery. In FIG. 3B, host OS 111 has been replaced with a new instance, host OS 111'. This includes new instances of components that were present in the host OS 111, such as OS components 112', virtualization stack 113', and fatal system error handler 114'. In FIG. 3B, arrows show that VMs 110, now operating on host OS 111' consume persisted VM state 118, and virtualization stack 113' consumes virtualization stack state 119.

Fatal system error handler 114 includes a fatal system error resumption component 208. In embodiments, fatal system error resumption component 208 resumes normal handling of the fatal system error, e.g., by releasing the hold initiated by error detection component 201. In embodiments, fatal system error resumption component 208 or failure logic 203 notifies control plane 120 that normal handling of the fatal system error will proceed.

In some situations, in-place recovery component 204 preserves state for and resumes execution of each of a plurality of VMs operating at computer system 101. In other situations, in-place recovery component 204 preserves state for and resumes execution of each of a subset of a plurality of VMs operating at computer system 101 (e.g., less than all VMs operating at computer system 101). In some embodiments, in-place recovery component 204 only attempts an in-place recovery of a subset of a plurality of VMs. For example, in-place recovery component 204 may only attempt an in-place recovery of VM(s) operating workloads that would be resilient to an in-place recovery, of VM(s) that have successfully been recovered in-place in the past, and the like. In another example, in-place recovery component 204 may attempt an in-place recovery of all VMs operating at computer system 101, but that recovery may only be successful for a subset of those VMs; nonetheless, even in this situation, some VMs have benefited from the in-place recovery.

Embodiments are now described in connection with FIG. 4, which illustrates a flow chart of an example method 400 for an in-place recovery of a fatal system error. In embodiments, instructions for implementing method 400 are encoded as computer-executable instructions (e.g., fatal system error handler 114) stored on a computer storage media (e.g., storage media 105) that are executable by a processor (e.g., processor system 103) to cause a computer system (e.g., computer system 101) to perform method 400.

The following discussion now refers to a method and method acts. Although the method acts are discussed in specific orders or are illustrated in a flow chart as occurring in a particular order, no specific ordering is required unless expressly stated or required because an act is dependent on another act being completed prior to the act being performed.

Figure 4:
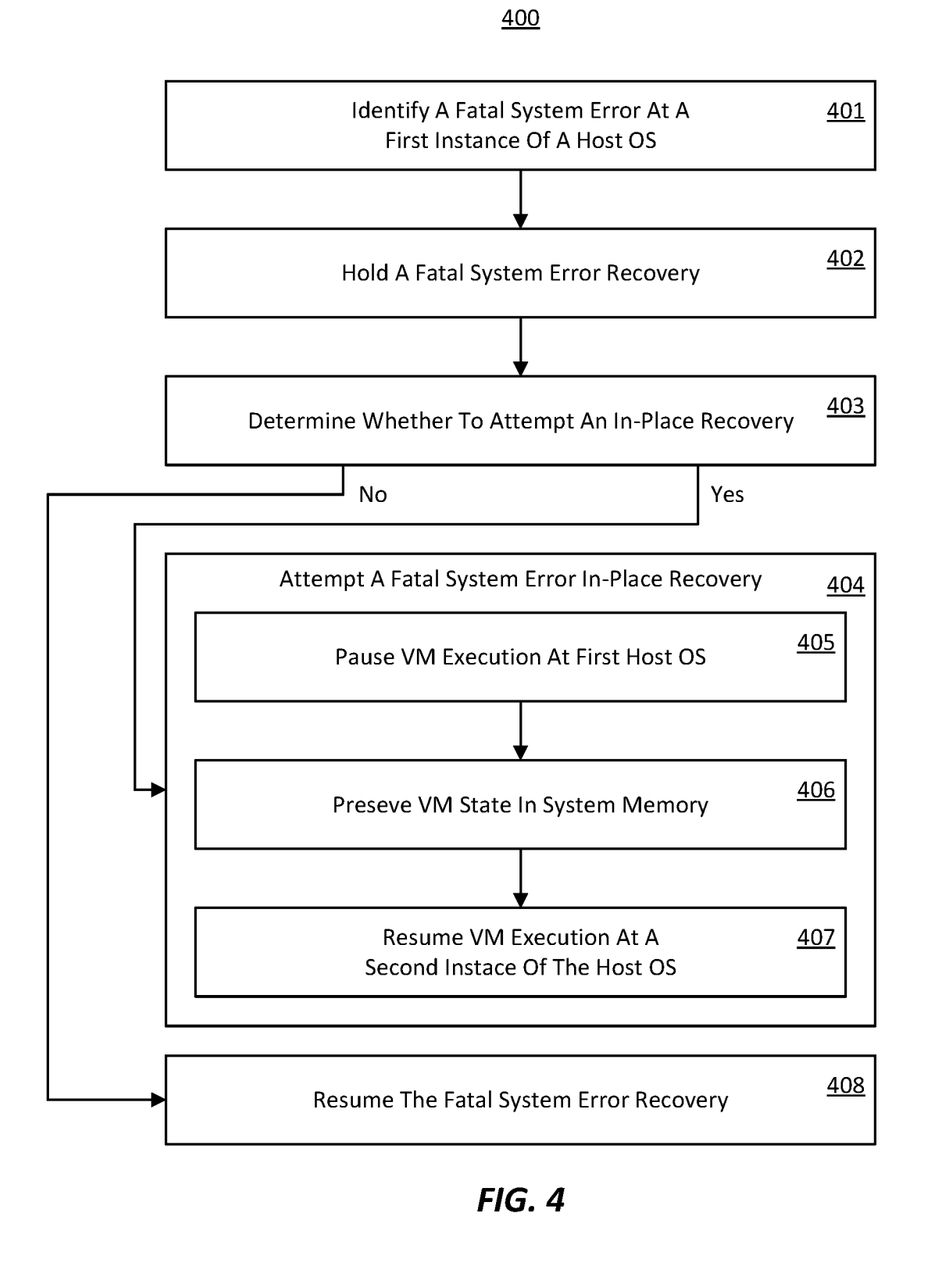
FIG. 4 illustrates a flow chart of an example of a method for an in-place recovery of a fatal system error.

Referring to FIG. 4, in embodiments, method 400 comprises act 401 of identifying a fatal system error at a first host OS. In some embodiments, act 401 comprises identifying an occurrence of a fatal system error in a first instance of a host OS executing in a computer system. For example, error detection component 201 determines that a fatal system error has occurred in connection with the execution of host OS 111 at host partition 109. In embodiments, error detection component 201 is registered to receive a callback, such as a crash notification, when fatal system errors occur, and act 401 is triggered by error detection component 201 receiving such a callback.

Method 400 also comprises act 402 of holding a fatal system error recovery. In some embodiments, act 402 comprises holding normal handling of the fatal system error by the first instance of the OS. For example, error detection component 201 holds further processing of the fatal system error, which prevents normal processing of the fatal system error. In embodiments, holding normal handling of the fatal system error includes suspending a thread that caused the fatal system error.

Method 400 also comprises act 403 of determining whether to attempt an in-place recovery. In embodiments, act 403 comprises determining whether an in-place recovery for the fatal system error is to be performed. For example, failure logic 203 estimates whether computer system 101 is likely to recover from the fatal system error if an in-place recovery is attempted. When failure logic 203 estimates that a successful in-place recovery is likely, failure logic 203 determines to proceed with the in-place recovery (in-place recovery component 204). Thus, in some embodiments, a result of act 403 is a determination to perform an in-place recovery for the fatal system error. In these embodiments, method 400 proceeds to act 404 of attempting a fatal system error in-place recovery. On the other hand, when failure logic 203 estimates that a successful in-place recovery unlikely, failure logic 203 determines to let the fatal system error proceed (fatal system error resumption component 208). Thus, in some embodiments, a result of act 403 is a determination not to perform an in-place recovery for the fatal system error. In these embodiments, method 400 proceeds to act 408 of resuming the fatal system error recovery.

In embodiments, determining whether to perform the in-place recovery for the fatal system error includes analyzing at least one of 1) a fatal system error type, 2) a result of a prior in-place recovery for the fatal system error type, 3) a result of a prior in-place recovery at the computer system, 4) an interruption tolerance of a workload executing on the VM, or 5) a downtime threshold of a SLA associated with the VM. In embodiments, the determination of whether to perform the in-place recovery for the fatal system error is fully decided by the computer system (e.g., using failure logic 121a). In embodiments, the determination of whether to perform the in-place recovery for the fatal system error includes sending a request to a control plane (e.g., for processing by failure logic 121).

In some embodiments, in-place recovery component 204 attempts in-place recovery for a plurality of VMs. Thus, in embodiments, pausing execution of the VM by the first instance of the host OS comprises pausing execution of each VM of a plurality of VM and preserving the state of the VM within system memory of the computer system comprises preserving the state of each VM of the plurality of VMs. In some situations, in-place recovery succeeds for all VMs for which it was attempted, such that resuming the execution of the VM by the second instance of the host OS comprises resuming the execution of each VM of the plurality of VMs. In other situations, in-place recovery succeeds only some of the VMs for which it was attempted, such that resuming the execution of the VM by the second instance of the host OS comprises resuming the execution of a subset of the plurality of VMs.

In embodiments in which method 400 proceeds to act 404 of attempting a fatal system error in-place recovery, act 404 comprises act 405 of pausing VM execution at a first instance of a host OS. In some embodiments, act 405 comprises pausing execution of a VM by the first instance of the host OS. For example, VM state persistence component 205 pauses the execution of VMs 110 (e.g., by suspending their virtual processors).

In some embodiments, act 404 also comprises act 406 of preserving VM state in system memory. In some embodiments, act 406 comprises preserving a state of the VM within the system memory of the computer system. For example, VM state persistence component 205 preserves, within storage media 105, VM state 118 (e.g., memory state, virtual processor register state). In embodiments, preserving the state of the VM within the system memory of the computer system comprises preserving the state of the VM during a shutdown (e.g., by OS recovery component 206) of the first instance of the host OS. Additionally, in some examples, VM state persistence component 205 also preserves, within storage media 105, other relevant information, such as a state of virtualization stack 113 (e.g., virtualization stack state 119). Thus, in some embodiments, act 406 also comprises preserving a virtualization stack state within the system memory of the computer system.

In embodiments, act 404 also comprises act 407 of resuming VM execution at a second instance of the host OS. In some embodiments, act 407 comprises, based on the state of the VM that is preserved within the system memory of the computer system, resuming the execution of the VM by a second instance of the host OS executing in the computer system. For example, VM state consumption component 207, which operates at the healthy second instance of host OS 111 restores the functioning of VMs 110 on top of this second instance of host OS 111.

In some embodiments, such as those that use VM-PHU technologies, the second instance of the host OS replaces the first instance of the host OS within a root partition. For example, performing the in-place recovery includes OS recovery component 206 initiating a soft reboot of the first instance of the host OS to create the second instance of the host OS within the root partition. In other embodiments, the first instance of the host OS resides in a first partition, and the second instance of the host OS resides in a second partition that is different from the first partition. For example, the second instance of the host OS is a standby host OS, or performing the in-place recovery includes OS recovery component 206 starting the second instance of the host OS within the second partition.

In embodiments in which method 400 proceeds to act 408 of resuming the fatal system error recovery, act 408 comprises resuming the normal handling of the fatal system error by the first instance of the OS. For example, fatal system error resumption component 208 resumes normal handling of the fatal system error, e.g., by releasing the hold initiated by error detection component 201 in act 401.

Embodiments of the disclosure may comprise or utilize a special-purpose or general-purpose computer system (e.g., computer system 101) that includes computer hardware, such as, for example, a processor system (e.g., processor system 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links that can carry program code in the form of computer-executable instructions or data structures and which can be accessed by a general-purpose or special-purpose computer system. A "network" is defined as one or more data links that enable the transport of electronic data between computer systems and other electronic devices. When information is transferred or provided over a network or another communications connection (either hardwired, wireless, or a combination thereof) to a computer system, the computer system may view the connection as transmission media. Combinations are included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106) and then eventually transferred to computer system RAM and/or to less volatile computer storage media at a computer system. Thus, computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a function or group of functions. Computer-executable instructions may be, for example, binaries, intermediate format instructions such as assembly language, or even source code.

It will be appreciated that the disclosed systems and methods may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts capable of running one or more virtual machines. During operation, virtual machines emulate an operational computing system, supporting an OS and perhaps one or more other applications. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system, comprising:
    identifying an occurrence of a fatal system error in a first instance of a host operating system (OS) executing in the computer system;
    determining to perform an in-place recovery for the fatal system error, wherein the in-place recovery preserves a virtual machine (VM) in the computer system while transitioning from the first instance of the host OS to a second instance of the host OS executing at the computer system; and
    performing the in-place recovery, including,
        pausing execution of the VM by the first instance of the host OS;
        preserving a state of the VM within a system memory of the computer system;
        preserving a virtualization stack state from a first virtualization stack in the first instance of the host OS;
        restoring the virtualization stack state into a second virtualization stack in the second instance of the host OS; and
        resuming the execution of the VM by the second instance of the host OS using the state of the VM that is preserved within the system memory of the computer system.

2. The method of claim 1, wherein the method further comprises holding normal handling of the fatal system error by the first instance of the OS.

3. The method of claim 1, wherein preserving the state of the VM within the system memory of the computer system comprises preserving the state of the VM during a shutdown of the first instance of the host OS.

4. The method of claim 1, wherein the second instance of the host OS replaces the first instance of the host OS within a root partition.

5. The method of claim 4, wherein performing the in-place recovery further includes initiating a soft reboot of the first instance of the host OS to create the second instance of the host OS within the root partition.

6. The method of claim 1, wherein the first instance of the host OS resides in a first partition and the second instance of the host OS resides in a second partition that is different from the first partition.

7. The method of claim 6, wherein the second instance of the host OS is a standby host OS.

8. The method of claim 6, wherein performing the in-place recovery further includes starting the second instance of the host OS within the second partition.

9. The method of claim 1, wherein preserving the virtualization stack state comprises preserving the virtualization stack state within the system memory of the computer system.

10. The method of claim 1, wherein determining to perform the in-place recovery for the fatal system error includes sending a request to a control plane.

11. The method of claim 1, wherein determining to perform the in-place recovery for the fatal system error includes analyzing at least one of,
   a fatal system error type,
   a first result of a first prior in-place recovery for the fatal system error type,
   a second result of a second prior in-place recovery at the computer system,
   an interruption tolerance of a workload executing on the VM, or
   a downtime threshold of a service level agreement (SLA) associated with the VM.

12. The method of claim 1, wherein,
   pausing execution of the VM by the first instance of the host OS comprises pausing execution of each VM of a plurality of VMs; and
   preserving the state of the VM within the system memory of the computer system comprises preserving the state of each VM of the plurality of VMs.

13. The method of claim 12, wherein resuming the execution of the VM by the second instance of the host OS comprises resuming the execution of each VM of the plurality of VMs.

14. The method of claim 12, wherein resuming the execution of the VM by the second instance of the host OS comprises resuming the execution of a subset of the plurality of VMs.

15. A computer system comprising:
   a processor system;
   a system memory; and
   a computer storage media that stores computer-executable instructions that are executable by the processor system to at least:
      identify an occurrence of a fatal system error in a first instance of a host operating system (OS) executing in the computer system; and
      perform an in-place recovery for the fatal system error, wherein the in-place recovery preserves a virtual machine (VM) in the computer system while transitioning from the first instance of the host OS to a second instance of the host OS executing at the computer system, including,
         pausing execution of the VM by the first instance of the host OS;
         preserving a state of the VM within the system memory of the computer system;
         preserving a virtualization stack state from a first virtualization stack in the first instance of the host OS;
         restoring the virtualization stack state into a second virtualization stack in the second instance of the host OS; and
         resuming the execution of the VM by the second instance of the host OS using the state of the VM that is preserved within the system memory of the computer system.

16. The computer system of claim 15, wherein the second instance of the host OS,
   replaces the first instance of the host OS within a root partition; or
   resides in a second partition that is different from a first partition in which the first instance of the host OS resides.

17. The computer system of claim 15, the computer-executable instructions also executable by the processor system to determine to perform the in-place recovery for the fatal system error based on at least one of,
   a fatal system error type,
   a first result of a first prior in-place recovery for the fatal system error type,
   a second result of a second prior in-place recovery at the computer system,
   an interruption tolerance of a workload executing on the VM, or
   a downtime threshold of a service level agreement (SLA) associated with the VM.

18. A method implemented in a computer system that includes a processor system comprising:
   identifying an occurrence of a fatal system error in a first instance of a host operating system (OS) executing in the computer system;
   holding normal handling of the fatal system error by the first instance of the OS;
      determining not to perform an in-place recovery for the fatal system error, including analyzing at least one of,
         a fatal system error type,
         a first result of a first prior in-place recovery for the fatal system error type,
         a second result of a second prior in-place recovery at the computer system,
         an interruption tolerance of a workload executing on a virtual machine (VM) executing at the computer system, or
         a downtime threshold of a service level agreement (SLA) associated with the VM; and
   resuming the normal handling of the fatal system error by the first instance of the OS.

19. The method of claim 18, wherein determining not to perform the in-place recovery for the fatal system error includes sending a request to a control plane.

20. The computer system of claim 15, wherein preserving the virtualization stack state comprises preserving the virtualization stack state within the system memory of the computer system.

* * * * *